(12) United States Patent  
Therriault

(10) Patent No.: US 6,227,483 B1  
(45) Date of Patent: May 8, 2001

(54) WING MOVEMENT FOR ORNITHOPTERS AND APPARATUS OF THE LIKE

(75) Inventor: Clément Therriault, deceased, late of St-Louis-de-Kent (CA), by Michel Therriault, administrator

(73) Assignee: Succession Clément Therriault, St. Louis-de-Kent (CA)

( * ) Notice: Subject to any disclaimer, the term of this patent is extended or adjusted under 35 U.S.C. 154(b) by 0 days.

(21) Appl. No.: 09/543,327

(22) Filed: Apr. 5, 2000

(51) Int. Cl.[7] .......................... B64C 27/00; B64C 33/00; B64C 33/02

(52) U.S. Cl. .................. 244/20; 244/72; 244/22; 416/110; 416/123; 440/93

(58) Field of Search .................. 446/34; 244/11, 244/22, 72, 20; 416/98, 101, 110, 123; 440/90, 92, 93

(56) References Cited

U.S. PATENT DOCUMENTS

| 1,694,602 | * | 12/1928 | Nuttall . | |
|---|---|---|---|---|
| 2,021,627 | | 11/1935 | Gilpin | 244/11 |
| 2,054,876 | * | 9/1936 | DeTryon-Montalembert | 170/153 |
| 3,161,376 | | 12/1964 | Lyle | 244/20 |
| 3,167,130 | | 1/1965 | Day | 170/160.1 |
| 3,270,820 | * | 9/1966 | Frazier | 170/135.21 |
| 3,498,574 | | 3/1970 | Ernst | 244/22 |
| 4,139,171 | | 2/1979 | Harris | 244/22 |
| 4,712,749 | | 12/1987 | Fox | 244/22 |
| 4,793,573 | | 12/1988 | Kelfer | 244/11 |
| 5,163,861 | | 11/1992 | Van Ruymbeke | 446/35 |
| 5,899,408 | | 5/1999 | Bowers, Jr. | 244/11 |

FOREIGN PATENT DOCUMENTS

| 1177941 | 9/1964 | (DE) . |
| 2706099 | 8/1978 | (DE) . |
| 885273 | 12/1961 | (GB) . |

* cited by examiner

*Primary Examiner*—Charles T. Jordan  
*Assistant Examiner*—Christian M. Best  
(74) *Attorney, Agent, or Firm*—Mario Theriault

(57) ABSTRACT

The wing movement has a gearbox, a reference gear extending through the gearbox and being movably mounted to the gearbox, an input shaft extending through the reference gear and into the gearbox and first and second output shafts movably extending from the gearbox at right angles with the input shaft. There is also provided a motor having a drive shaft connected to the input shaft of the gearbox for rotation of the input shaft. A bracket is connected to the motor base and to the reference gear for retaining the reference gear to the motor base, with an axis of the reference gear in alignment with the drive shaft of the motor. A gearing system is mounted inside the gearbox for rotating the first and second output shafts one full turn in opposite directions relative to each other, upon a rotation of the input shaft one full turn, and for rotating the gearbox one full turn about the reference gear upon a rotation of the first and second output shafts one full turn. A pair of wings is mounted to the output shafts and are movable along a curved infinity-symbol-like pattern projecting substantially along one side of the motor.

20 Claims, 11 Drawing Sheets

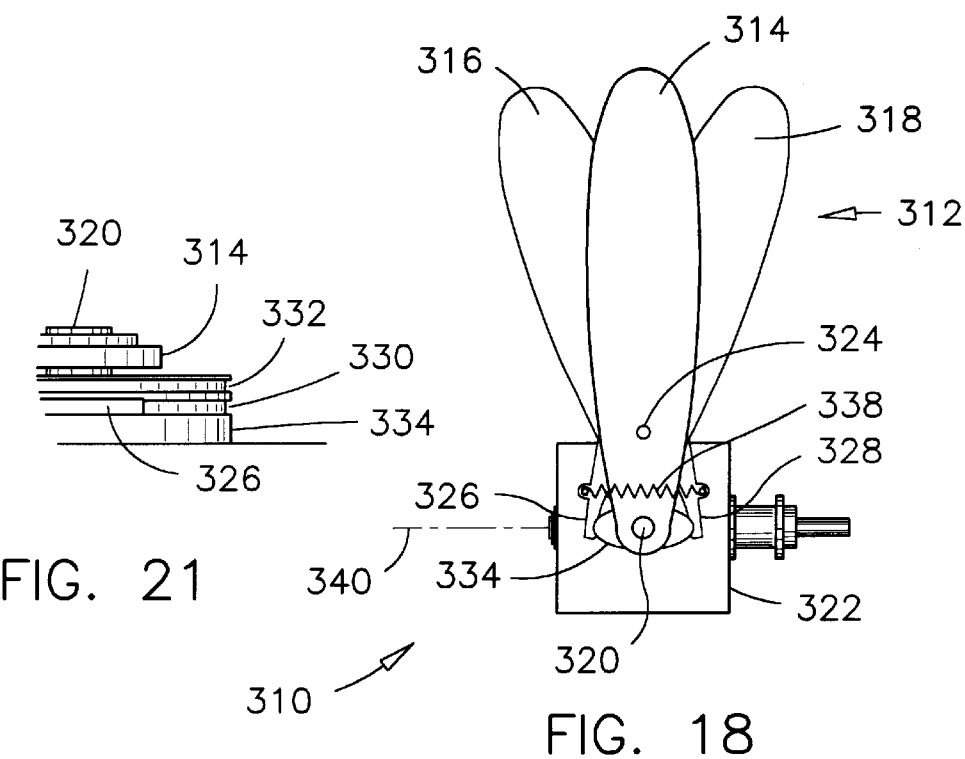
FIG. 21
FIG. 18
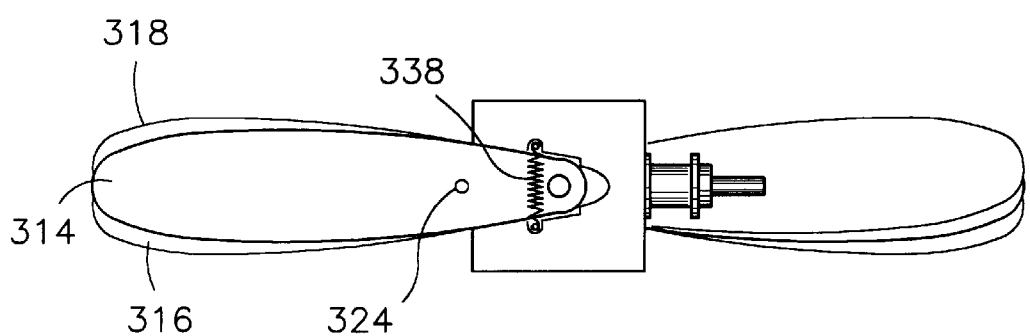
FIG. 19
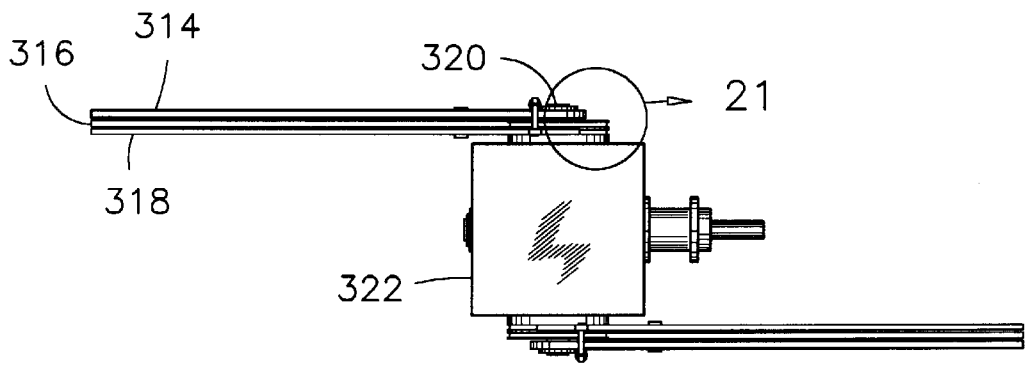
FIG. 20

WING MOVEMENT FOR ORNITHOPTERS AND APPARATUS OF THE LIKE

FIELD OF THE INVENTION

This invention pertains to a wing movement for ornithopters, and more particularly, the present invention pertains to a wing movement wherein the wings descend on their broad sides and ascend on their edges.

BACKGROUND OF THE INVENTION

Aviation history abounds of inventions of all sorts to imitate the wing movements of birds. A common objective of these inventions is to enable a person to fly like a bird such as to swiftly take the air or set down at will. Despite all the flying machines known today, it is believed that the mechanism of bird flight has not yet been fully understood and advantageously adapted to flying apparatus. Consequently, many birds and flying insects have been the subject of numerous studies.

Of particular interest is the wing movement of some birds capable of climbing straight up, maintaining a stationary position and even flying backward according to some observations. The wing movement of these birds is that the wings flap down with their broad sides and move up on their edges. The Hummingbird probably represents the best known bird species having such a wing movement. Other bird species having the described wing movement include the Osprey, the Rough-Legged Hawk, the American Kestrel and the Tern.

The wing movement of these birds continues to interest many, mainly because it is believed to represent an ideal concept for developing a compact and versatile flying apparatus capable of taking off and landing without a runway.

Some examples of prior art mechanisms related to the wing movements of ornithopters are described in the following documents:

U.S. Pat. No. 2,021,627 issued on Nov. 19, 1935 to A. T. Gilpin;
U.S. Pat. No. 3,161,376 issued on Dec. 15, 1964 to H. M. Lyle;
U.S. Pat. No. 3,498,574 issued on Mar. 3, 1970 to A. Ernst;
U.S. Pat. No. 4,139,171 issued on Feb. 13, 1979 to J. M. Harris;
U.S. Pat. No. 4,712,749 issued on Dec. 15, 1987 to D. Fox;
U.S. Pat. No. 4,793,573 issued on Dec. 27, 1988 to J. W. Kelfer;
U.S. Pat. No. 5,163,861 issued on Nov. 17, 1992 to G. Van Ruymbeke;
U.S. Pat. No. 5,899,408 issued on May 4, 1999 to K. R. Bowers, Jr.;
GB Patent 885,273 published on Dec. 20, 1961;
DE Patent No. 1,177,941 published on Sep. 10, 1964;
DT Patent 2,706,099 published on Aug. 17, 1978;

Although the ornithopters of the prior art deserve undeniable merits, these apparatus generally have an air plane configuration with relatively wide wing span, and therefore are susceptible of requiring a substantial speed to take the air and to remain airborne.

Therefore it is believed that a need still exists for a compact wing movement which is characterized by a down stroke on the flat side of the wing and an up stroke on the edge of the wing. A need still exists for an effective wing movement which can be built using common technology with common parts and at a reasonable price.

SUMMARY OF THE INVENTION

The present invention provides for a wing movement which has the advantageous bird-like motion and which is driven by a common motor and gearing system. The wing movement according to the present invention has a compact arrangement and can be used to propel various types of ornithopters.

In a broad aspect of the present invention, there is provided a wing movement comprising a base, a first and second perpendicular axes, the second axis intersecting the first axis at a mid point of the first axis, and means for retaining the second axis to the base. A pair of spaced apart wings is mounted on the first axis, one wing on each side of the second axis. There are also provided means for rotating the wings in opposite directions relative to each other about the first axis, and means for rotating the first axis and the wings about the second axis. The wing movement also has means for synchronising a rotation of the wings about the first axis with a rotation of the first axis and the wings about the second axis.

This wing movement is particularly advantageous for the motion which is defined by its wings. Both wings are movable along a curved infinity-symbol-like pattern projecting substantially along one side of the second axis. The wings are movable in synchronization with each other without interfering with their individual motions nor intersecting the second axis. Both wings are movable along this pattern while descending on their broad sides and ascending on their edges to closely imitate the effect of the wing motion of a hummingbird for example.

In another aspect of the present invention, there is provided an ornithopter propelling arrangement comprising a first and second wing movements and a frame mounted between and holding the first and second wing movements in a spaced-apart relationship. The first wing movement comprises first and second perpendicular axes, the second axis intersecting the first axis at a mid point of the first axis, and means for retaining the second axis to the frame. A pair of spaced-apart first wings is mounted on the first axis, one wing on each side of the second axis. The first wings are rotatable in opposite directions about the first axis, and the first axis is rotatable about the second axis. The first wings are rotatable in synchronization with each other and with a rotation of the first axis about the second axis. The second wing movement comprises a third and fourth perpendicular axes, the fourth axis intersecting the third axis at a mid point of the third axis, and means for retaining the fourth axis to the frame. A pair of spaced apart second wings is mounted on the third axis, one wing on each side of the fourth axis. The second wings are rotatable in opposite directions about the third axis and the third axis is rotatable about the fourth axis. The second wings are rotatable in synchronization with each other and with a rotation of the third axis about the fourth axis. The first axis is rotatable in a first direction and the fourth axis is rotatable in a second direction opposite the first direction.

In this ornithopter propelling arrangement, the first wings are movable along a first curved infinity-symbol-like pattern projecting substantially along one side of the frame, and the second wings are movable along a second infinity-symbol-like pattern projecting along a second side of the frame opposite the first side. The wing movements in this propelling arrangement are deployable on each side of a central space between the wing movements. This space can be advantageously used to carry control equipment and accommodation for an ornithopter operator for example.

In a further aspect of the present invention, there is provided a wing movement for use in ornithopters and apparatus of the like, comprising: a gearbox having a housing, a reference gear extending through the housing and being movably mounted to the housing, an input shaft extending through the reference gear and into the housing and a first and second output shafts movably extending from the housing along a common axis at right angle relative to the input shaft. There is also provided a motor having a motor base and a drive shaft connected to the input shaft of the gearbox for rotation of the input shaft. A bracket is connected to the motor base and to the reference gear for retaining the reference gear to the motor base, with an axis of the reference gear in alignment with the drive shaft of the motor. A gearing system is mounted inside the housing for rotating the first and second output shafts one full turn in opposite directions relative to each other, upon a rotation of the input shaft one full turn, and for rotating the gearbox one full turn about the reference gear upon a rotation of the first and second output shafts one full turn. The wing movement also comprises first and second wings mounted to the first and second output shafts respectively outside the gearbox for rotation by the first and second output shafts. When the motor base is adapted to be held fixed and the motor is adapted to be operated, both wings are movable along a curved infinity-symbol-like pattern projecting substantially along one side of the motor.

This structure of the wing movement is relatively simple, relatively light in weight and compact in size. It is built with common power transmission parts using common technology. It is believed that a small version of this structure can be mounted in various light ornithopter configurations.

The wing movement of the present invention is intended for use in propelling flying devices such as personal ornithopters, flying toys and remotely controlled flying robotic instruments. The wing movement described herein produces a wing motion that is believed to imitate very closely, when seen at high speed, the wing motion of a hummingbird or of a bee. Therefore, the wing movement of the present invention is also intended for use in imitating the wing motions of birds and flying insects for scientific research, in instructional models, in film-making replicas and moke-ups and in special-effect disguises of heavenly creatures for examples.

Still another feature of the present invention is that it is susceptible of a low cost of manufacture with regard to both materials and labor, and which accordingly is then susceptible of low prices of sale to the consumer, thereby making such wing movement economically available to the public.

Other advantages and several novel features of the present invention will become apparent from the following detailed description of the preferred embodiment of the present invention, and of several adaptations thereof.

BRIEF DESCRIPTION OF THE DRAWINGS

One embodiment of the present invention and several adaptations thereof are illustrated in the accompanying drawings, in which like numerals denote like parts throughout the several views, and in which:

FIG. 18 is a first plan view of a fifth adaptation of the wing movement according to the preferred embodiment wherein each wing comprises three blades which are alternately deployed and stacked by a cam mounted to the gearbox housing;

FIG. 19 is a second plan view of the fifth adaptation of the preferred embodiment showing the blades in a stacked mode to reduce air resistance thereon during the return quadrants of the wing cycle;

FIG. 20 is a side view of the illustration in FIG. 19;

FIG. 21 is an enlarged partial side view of the cam mounted to the gearbox in the fifth adaptation of the preferred embodiment, as seen in detail circle 21 in FIG. 20;

DETAILED DESCRIPTION OF THE PREFERRED EMBODIMENT

Figure 1:
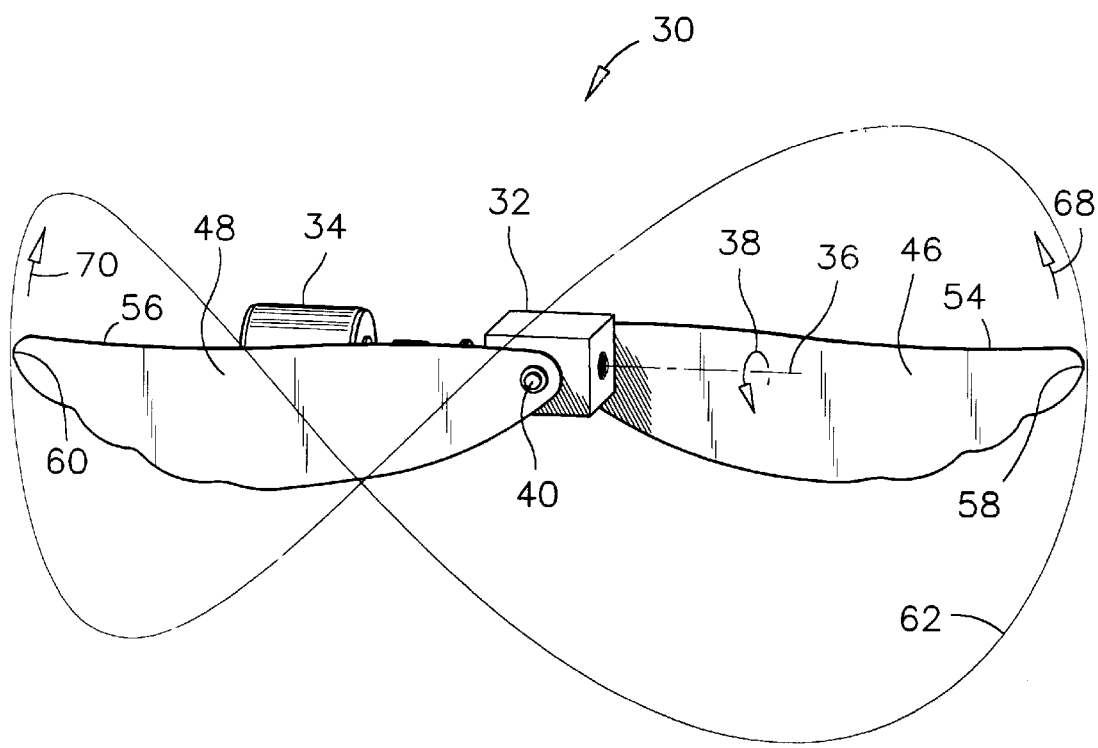
FIG. 1 is a first perspective side view of the wing movement according to the preferred embodiment of the present invention with the wings thereof shown in the up-stroke quadrants of the wing cycle.

While this invention is susceptible of embodiments in many different forms, there are shown in the drawings and will be described in details herein one preferred embodiment of the present invention and eight (8) specific adaptations of this preferred embodiment, with the understanding that the present disclosure is to be considered as an example of the principles of the invention and is not intended to limit the invention to the embodiment and adaptations illustrated.

Figure 2:
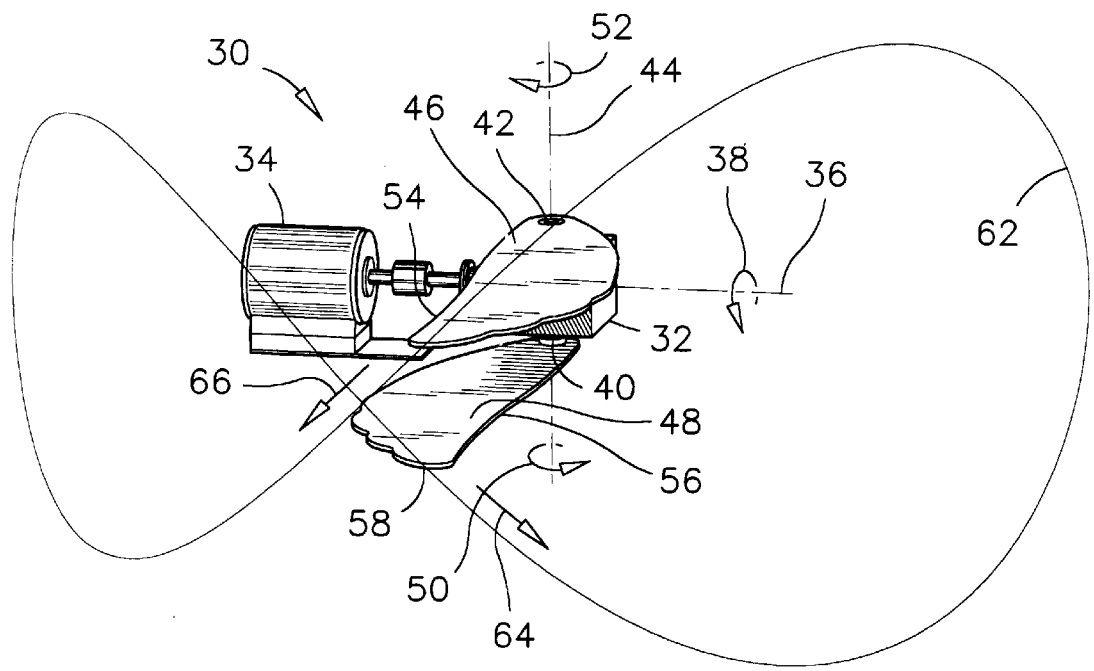
FIG. 2 is a second perspective side view of the wing movement, with the wings thereof shown in the down-stroke quadrants of the wing cycle.

Referring firstly to FIGS. 1 and 2, the wing movement 30 according to the preferred embodiment comprises a gearbox 32, a drive motor 34 connected to the gearbox 32 for rotation of the gearbox about an horizontal articulation axis 36, in a direction indicated by arrow 38 for example. The gearbox 32 has one or more output shafts. In the illustrated embodiment, the gearbox 32 has two output shafts 40, 42 extending along a common axis 44 set at right angle with the articulation axis 36. A pair of wings 46, 48 is mounted to the output shafts 40, 42. A gearing system inside the gearbox 32 actuates each output shafts 40, 42 one full turn in opposite directions from each-another about axis 44, for every rotation of the gearbox 32 and the common axis 44 about the articulation axis 36, as indicated by arrows 50, 52.

In order to facilitate the understanding of the wing motion effected by the wing movement 30, it is best to consider the illustrations in FIGS. 1 and 2 simultaneously wherein the wings 46, 48 are illustrated in two different positions along a full cycle of the wings. Each of the illustrated positions corresponds to the up-stroke and down-stroke quadrants of a full cycle respectively. A full cycle of the wings is determined by a full rotation of the gearbox 32 about the articulation axis 36.

In the first position, a first quadrant of the gearbox for example, as illustrated in FIG. 1 the wings 46, 48 are moving up with their leading edges 54, 56 pointing upward. When the gearbox 32 rotates a quarter of a turn, in the direction of arrow 38, in a second quadrant of the gearbox, the wings take their descending positions with their broad sides substantially flat against the directions of movement, as illustrated in FIG. 2. The rotation of the gearbox 32 another quarter of a turn, in a third quadrant, causes the wing 46 to take the position backward near the motor 34 such as the position of wing 48 in FIG. 1, and causes the wing 48 to take the position forward such as the position of wing 46 in FIG. 1. In the fourth quadrant of the gearbox, the wings take again the positions as shown in FIG. 2. Hence, the illustration of FIG. 1 shows the positions of the wings in a first and third quadrants of a full cycle, and the illustration of FIG. 2 shows the positions of the wings in a second and fourth quadrants of a full cycle.

During the movement of the wings 46, 48, the tips 58, 60 of the wings follow a path resembling the shape of a curved infinity symbol $\infty$ as represented by the bowknot-like figure labelled as 62.

In the second and fourth quadrants, the wings 46, 48 are actuated into combined downward motions as indicated by arrows 64, 66, to generate a lifting force on the gearbox 32, and in rotational motions 50 and 52 in directions ahead of their respective leading edges 54, 56.

In the first and third quadrants, the wings 46, 48 move upward on their edges in directions represented by arrows 68 and 70 to minimize the air resistance on the wings between the effective segments mentioned above.

Figure 3:
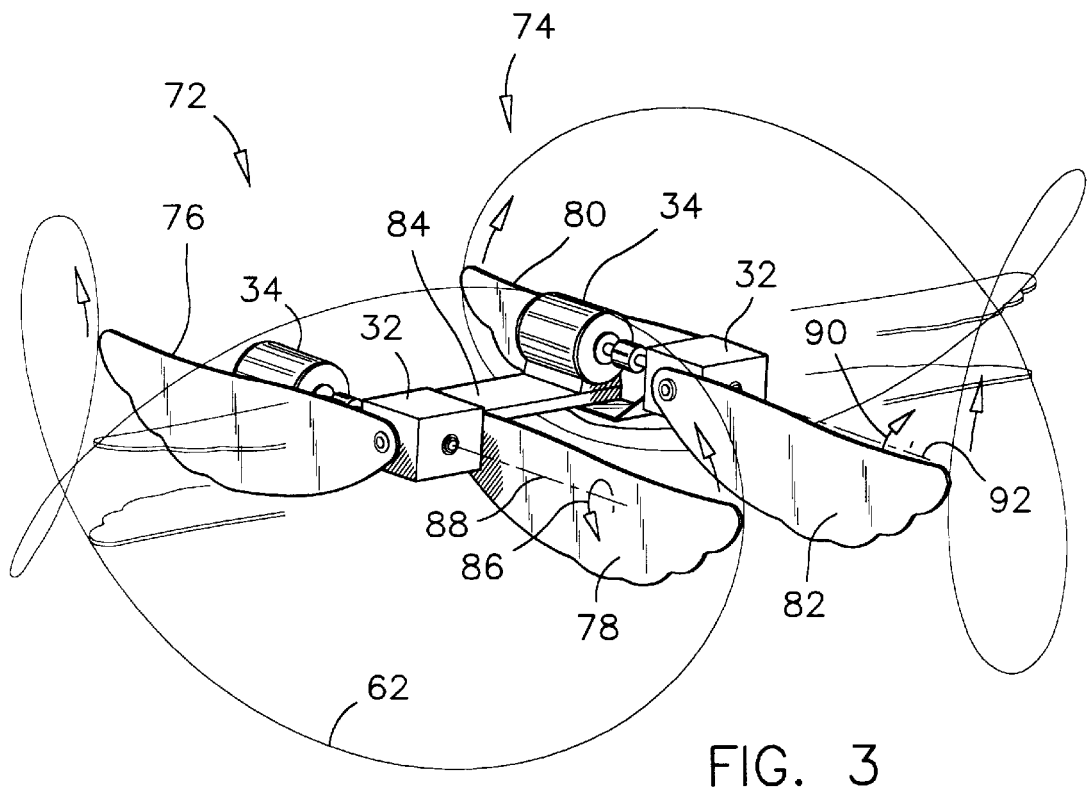
FIG. 3 is a perspective front and side view of a first ornithopter propelling arrangement incorporating a pair of wing movements according to the preferred embodiment, mounted in a tandem mode.
Figure 4:
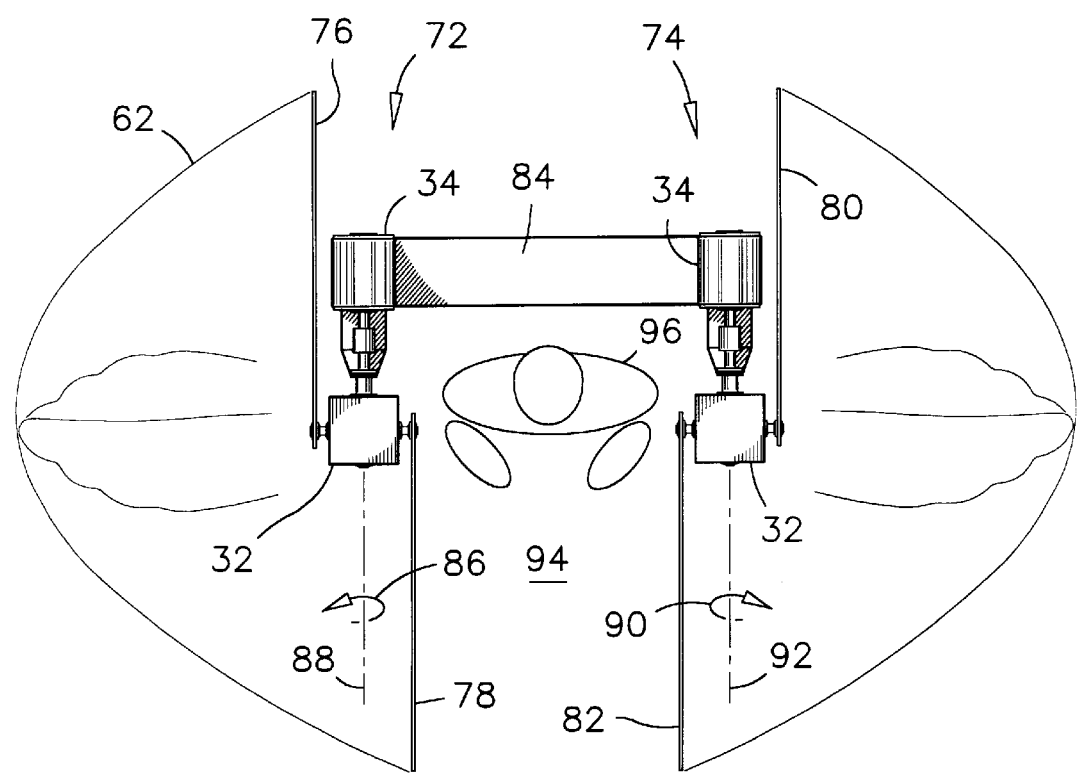
FIG. 4 is a top view of the first ornithopter propelling arrangement illustrated in FIG. 3.

Referring now to FIGS. 3 and 4, the operation of a pair of wing movements 72 and 74 having each a pair of wings 76, 78 and 80, 82 mounted thereon respectively will be described. In these illustrations, the wings are shown in shadow lines during their effective segments of their cycles. The wings are shown in solid lines during the return segments of their cycles.

Each wing movement 72 or 74, has a gearbox 32 and a motor 34. The wing movements 72, 74 are mounted to a spanner frame 84 and are held apart in a parallel orientation relative to each other, although this is not essential. The gearbox 32 in the first wing movement 72 is rotatable in a first direction 86, about a first articulation axis 88. The gearbox 32 in the second wing movement 74 is rotatable in a second direction 90, opposite the first direction 86, about a second articulation axis 92.

It will be appreciated that when the wings are articulated as previously described, the wings are flapping down on both sides of a central space 94 adjacent the spanner frame 84, without intersecting the central space 94, as illustrated in FIG. 4. The wings are returning upward with their broad surfaces aligned substantially vertically, by moving along the central space 94 and along the motor 34 of each wing movement. It will also be appreciated that the axes 88 and 92 of the wing movements may be non-parallel and forming an angle to enlarge the central space 94 if needed.

Because the wings do not intersect the central space 94, the central space 94 may be advantageously used for mounting a seat (not shown) for an operator 96 of an ornithopter for example, or for mounting a control device (not shown) for controlling a flying apparatus having a pair of wing movements 72, 74 according to the preferred embodiment.

Although the ornithopter propelling arrangement is illustrated in a horizontal position, it may be appreciated that this arrangement can be tilted into a vertical alignment when not being used, for reducing the encumbrance thereof during storage or transport for example.

Also because of the compact arrangement of the illustrated wing movement, it is believed that the step is slight to design and build a lightweight version thereof for mounting in a small personal flying apparatus comprising a seat and a light frame. In that respect, those knowledgeable in the field of Machine Design will appreciate that a pair of wing movements may be synchronously driven by a single compact engine and a pair of flexible drive shafts.

Figure 5:
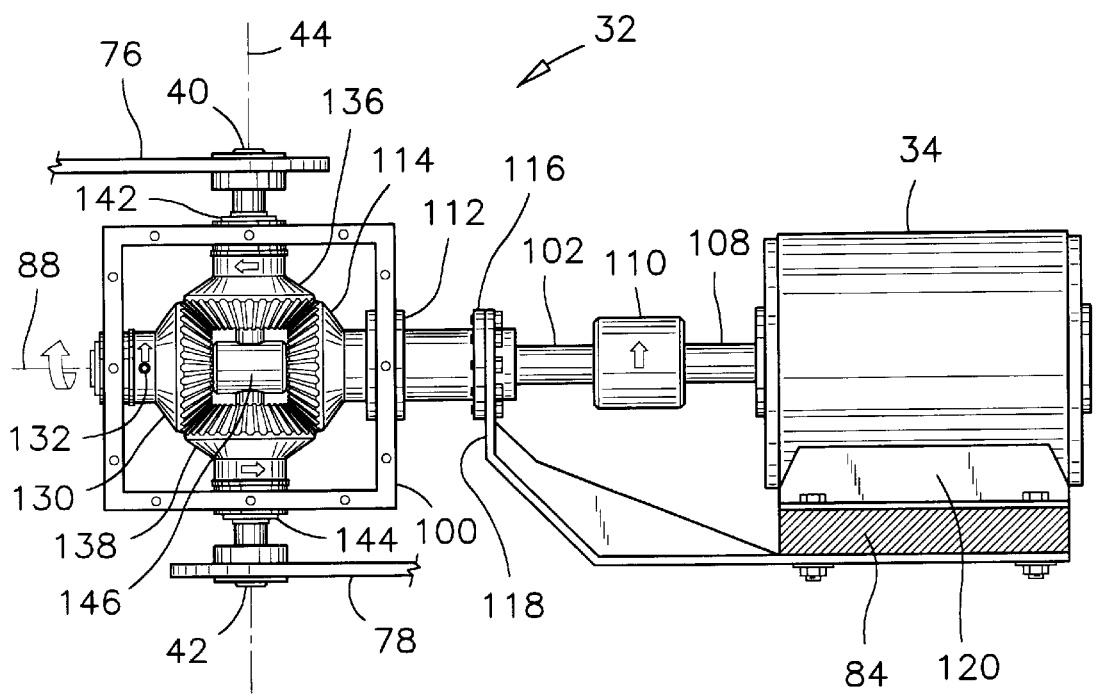
FIG. 5 is a partial side view of the drive arrangement for the wing movement, as seen with the cover of the gearbox removed.
Figure 6:
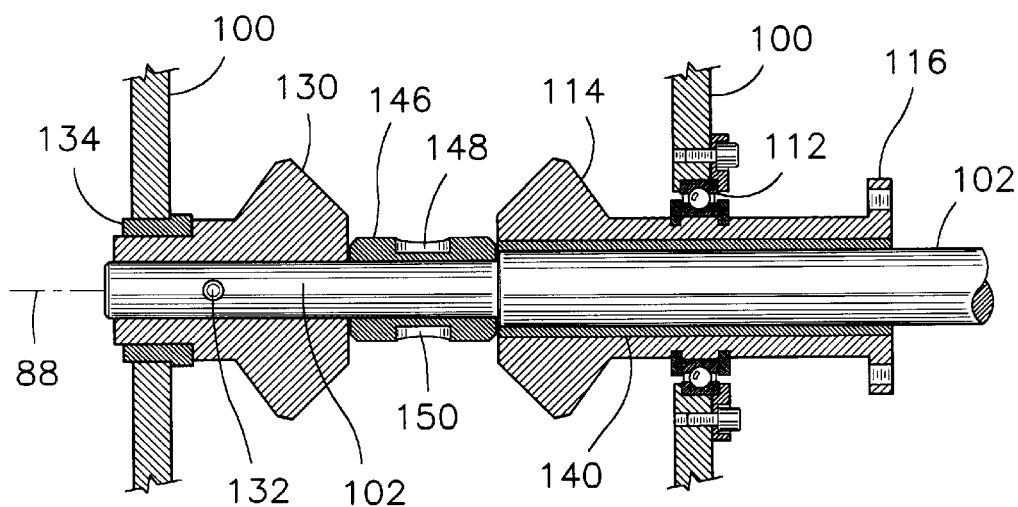
FIG. 6 is an enlarged partial cross-section view through the gearbox of the preferred wing movement.
Figure 7:
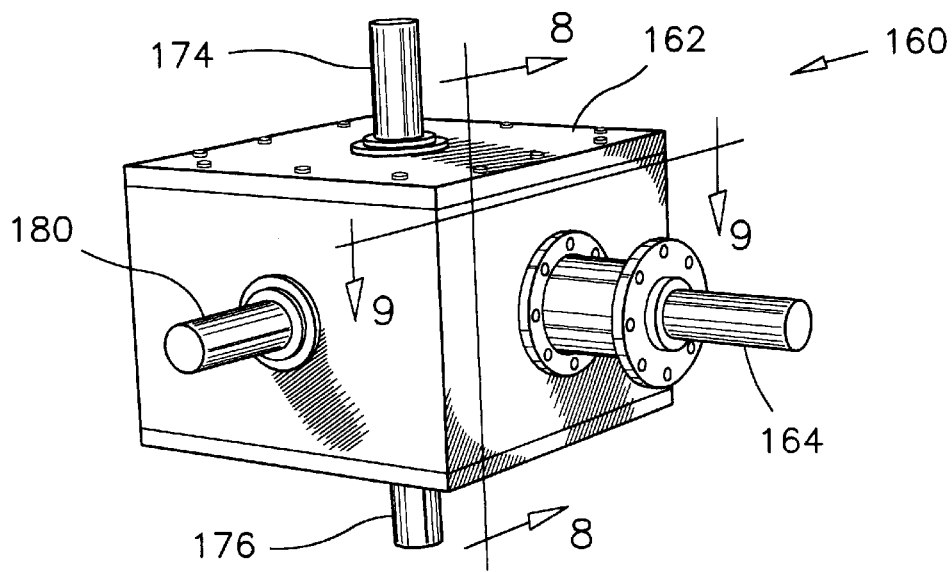
FIG. 7 is a perspective view of a gearbox in the first four-wing adaptation of the wing movement according to the preferred embodiment of the present invention.
Figure 8:
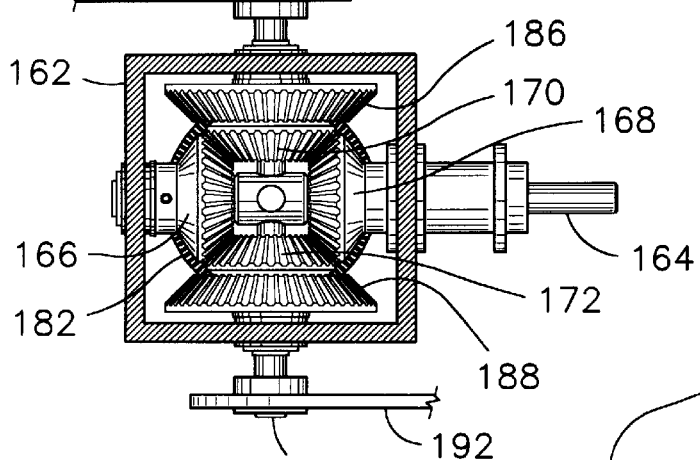
FIG. 8 is a first cross-section view through the gearbox of FIG. 7, as seen along line 8—8 in FIG. 7.
Figure 9:
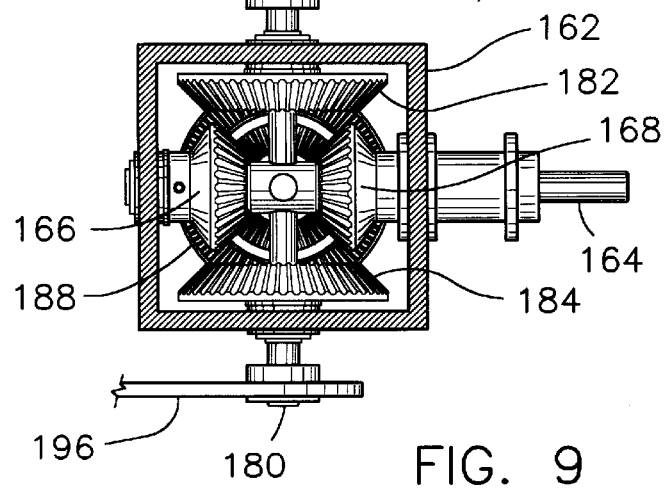
FIG. 9 is a second cross-section view through the gearbox of FIG. 7, as seen along line 9—9 in FIG. 7.

Referring now to FIGS. 5 and 6, the gearbox 32 of the wing movement according to the preferred embodiment and the operation thereof will be described in details.

The gearbox 32 comprises a housing 100, an input shaft 102 and a pair of opposite output shafts 40, 42, extending at right angle relative to the input shaft 102. The wings 76 and 78 for example, are mounted to the output shafts 40 and 42 respectively. The input shaft 102 is connected to the motor's shaft 108, by means of a shaft coupling 110. The input shaft 102 and the entire gearbox 32 are supported in an overhung mode relative to the spanner frame 84, by means of the shaft coupling 110 and of a support bearing 112 mounted over a fixed bevel gear extending through the housing 100 of the gearbox, hereinafter referred to as the reference bevel gear 114. The input shaft 102 extends through the reference bevel gear 114 along an axis of this gear. The reference bevel gear 114 has a flange 116 which is bolted to a stiff bracket 118 which also contributes to supporting the gearbox in the overhung mode. The stiff bracket 118 is affixed to the spanner frame 84 and to the motor base 120. The motor base 120 is also affixed to the spanner frame 84. The arrangement illustrated and described allows a rotation of the gearbox 32 about an articulation axis 88 for example, along the motor's drive shaft 108.

The gearbox 32 encloses three additional bevel gears engaged with one-another at right angle. The drive bevel gear or the drive pinion 130 is keyed to the input shaft 102 by means of a shaft key (not shown) or a spring pin 132, for rotation with the input shaft 102. The drive pinion 130 is movably mounted into a first sleeve bearing 134 extending through or affixed to the housing 100, although a bearing at this location is not absolutely necessary.

The drive pinion 130 is engaged at right angle with a pair of driven bevel gears 136 and 138 keyed to the output shafts 40 and 42 respectively. The driven bevel gears 136,138 are also engaged at right angle with the reference bevel gear 114.

The input shaft 102 extends through the reference bevel gear 114, and is guided through the reference bevel gear 114, by means of a second bearing sleeve 140 mounted through the reference bevel gear 114.

The ratio between any two of the bevel gears 130, 136, 138 and 114 is a one-to-one factor such that one turn of the drive pinion 130 causes the output shafts 40 and 42 to rotate one turn about themselves, and one turn around the reference bevel gear 114, thereby entraining the housing 100 one full turn about the axis 88.

In the preferred gearbox 32, the output shafts 40, 42 are guided through a respective bearing 142 or 144 and into an idler sleeve bearing 146 which is movably mounted over the input shaft 102, between the drive pinion 130 and the reference bevel gear 114. The idler sleeve bearing 146 has a pair of cavities 148, 150 therein for receiving the ends of the output shafts 40 and 42 respectively.

The material of the sleeve bearings 134, 140 and 146 is cast bearing bronze, cadmium alloys, Ultra-Heavy-Molecular-Weight plastic or other similar frictionless and wear-resistant materials known to those knowledgeable in the field of Machine Design.

Having described the gearing system inside the gearbox 32 in the wing movement according to the preferred embodiment, it can now be better appreciated that the rotation of the motor 34 causes the wings 76 and 78 to rotate around an axis 44 defined by the output shafts 40 and 42, and at the same time it causes the gearbox 32 to rotate about the axis 88. The combined rotations of the gearbox 32 and of the output shafts 40, 42, causes the wings 76, 78 to move along a complex double-loop path resembling the infinity-symbol-like pattern 62 extending along an horizontal arc of about 180°, as illustrated in FIGS. 1–4.

As mentioned before, the reference bevel gear 114 extends through the housing 100 and is affixed to the bracket 118 by machine bolts or otherwise. The reference bevel gear 114 is therefore fixed relative to the spanner frame 84 and ensures that the wing motion is synchronised with the angular displacement of the gearbox 32.

Those knowledgeable in the art will understand that in another embodiment, it is possible to adjust the angular position of the reference bevel gear 114 relative to the bracket 118 to simultaneously adjust the position of the effective segments of the wings relative to an horizontal plane to control the lift on one or both wing movements 72, 74 for example for manoeuvring a flying apparatus. A suggested mechanism to obtain such manoeuvrability will be explained briefly when making reference to FIG. 26.

It is also believed that the rotational speed and capacity of the motor and the size and shape of the wings in each wing movement can be calibrated for obtaining substantial lifting forces and for meeting the requirements of numerous practical applications of the present invention.

The preceding disclosure has emphasized on the basic structure of the preferred embodiment of the present invention, using one and two wing movements. Having described this basic structure, it will be appreciated that a number of adaptations of this basic structure is possible and is limited only by the design skills of those using the invention. Some of these possible adaptations are briefly explained herein after.

A first adaptation of the basic structure of the wing movement 30 is shown in FIGS. 7–11. This adaptation comprises a gearbox 160 having four output shafts extending at right angle with an adjacent one. The gearbox 160 comprises a housing 162, one input shaft 164, one drive pinion 166, a reference bevel gear 168 and two driven bevel gears 170, 172. Two opposite output shafts 174, 176 are connected to the driven bevel gears 170, 172 and are operated as previously explained.

The third and fourth output shafts 178, 180 are driven by bevel gear plates 182, 184 which are engaged with crown bevel gears 186, 188. These latter crown bevel gears are mounted to the driven bevel gears 170, 172 respectively, and rotated with the driven bevel gears without intersecting neither the drive pinion 166 nor the reference bevel gear 168. The crown bevel gears 186, 188 and the gear plates 182 and 184, have a one-to-one gear ratio with one-another such that one turn of the input shaft 164 causes the third and fourth output shafts 178 and 180 to rotate one turn in a similar manner as previously explained when making reference to the basic structure of the wing movement. When wings 190, 192, 194 and 196 are mounted to the output shafts 174, 176, 178 and 180 respectively, each wing moves along a respective side of the gearbox. The opposite wings rotate in opposite directions of each other. The adjacent wings also move in opposite directions of each other.

Figure 10:
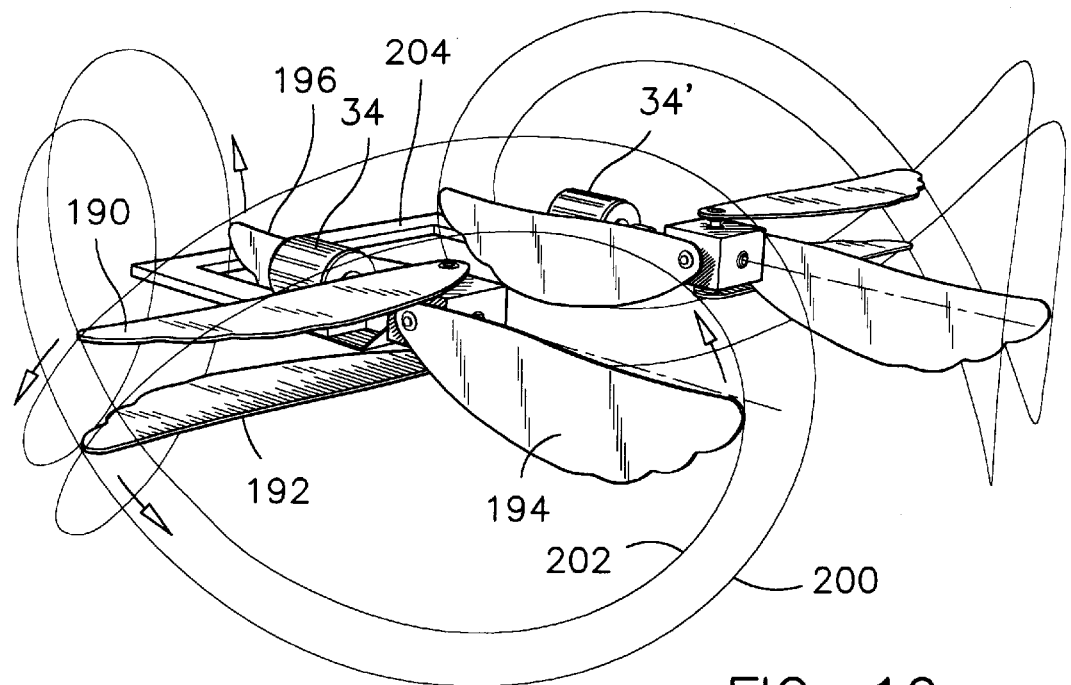
FIG. 10 shows a front and side perspective view of a second ornithopter propelling arrangement having a pair of wing movements according to the first adaptation of the preferred embodiment.
Figure 11:
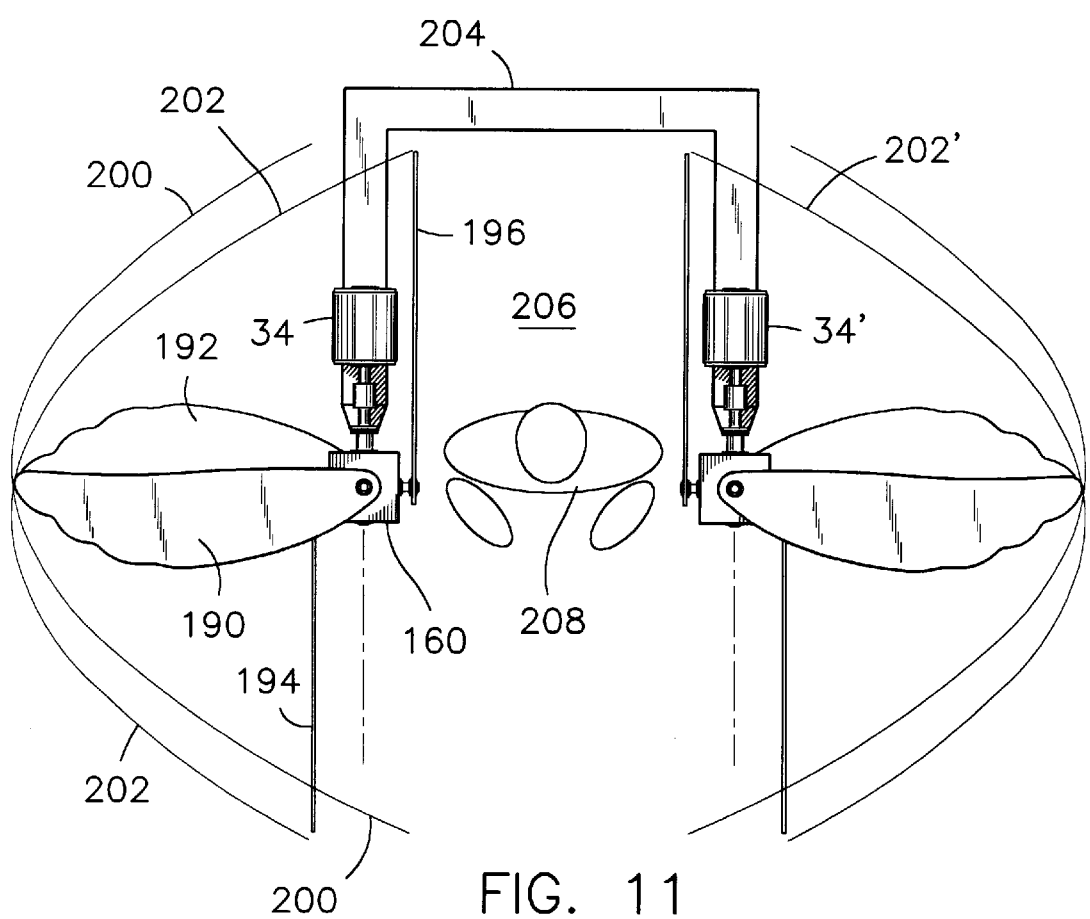
FIG. 11 illustrates a top view of the second ornithopter propelling arrangement illustrated in FIG. 10.

The wing paths of this adaptation of the preferred embodiment is better explained by making reference to the illustrations of FIGS. 10 and 11. The example depicted therein shows a first pair of wings 190, 192 moving along a first wing path 200 as explained before, while the second pair of wings 194, 196 follow a second wing path 202 without intersecting the first path nor interfering with the displacement of the first pair of wings. In this adaptation, each of the four wings occupies a different quadrant relative to the other wings and relative to both wing paths 200, 202.

The first pair of wings 190, 192 moves outside the motor 34 relative to an effective side of the wing movement, and the second pair of wings 194, 196 moves on the inside side of the motor 34. Therefore when two wing movements are used in a tandem mode as illustrated in FIGS. 10 and 11, the spanner frame 204 has a U-like configuration extending from the motors 34, 34' to a region outside the wing paths 202, 202'.

As can be appreciated, this adaptation of the wing movement of the present invention also provides sufficient unobstructed space 206 between the wing movements to accommodate support equipment and space for an ornithopter operator 208 for example.

Reference may now be made to FIGS. 12 to 15 to appreciate the second and third adaptations of the basic structure of the wing movement 30 according to the preferred embodiment. In the second adaptation 210 in particular, each of the two output shafts 212, 214 is connected to one of two gear trains 216, 218 affixed to a respective side of the gearbox 220. In the second adaptation, the gear trains 216, 218 are mounted in a natural-like musical sign arrangement. Each gear train encloses a drive gear 222 or 224, each being mounted to one of the output shafts 212 or 214 respectively. Each of drive gears 222 or 224 is meshed with an idler gear assembly 226 or 228. Each idler gear assembly 226 or 228 is meshed with a driven gear 230 or 232 and causes each driven gear to rotate in a same direction as the corresponding drive gear 222 or 224.

Figure 14:
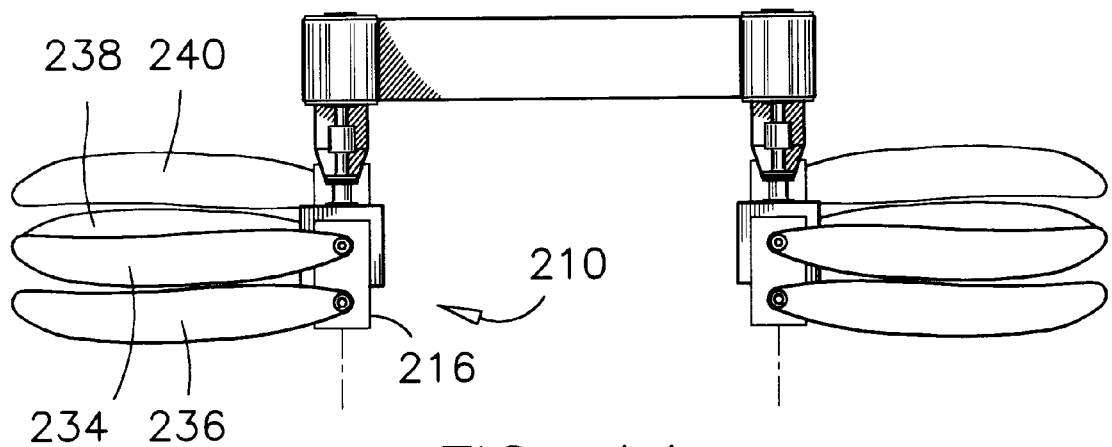
FIG. 14 is a first top view of a third ornithopter propelling arrangement comprising the gear trains of FIG. 12, wherein the wings are positioned along the effecting quadrants of the wing cycle.
Figure 15:
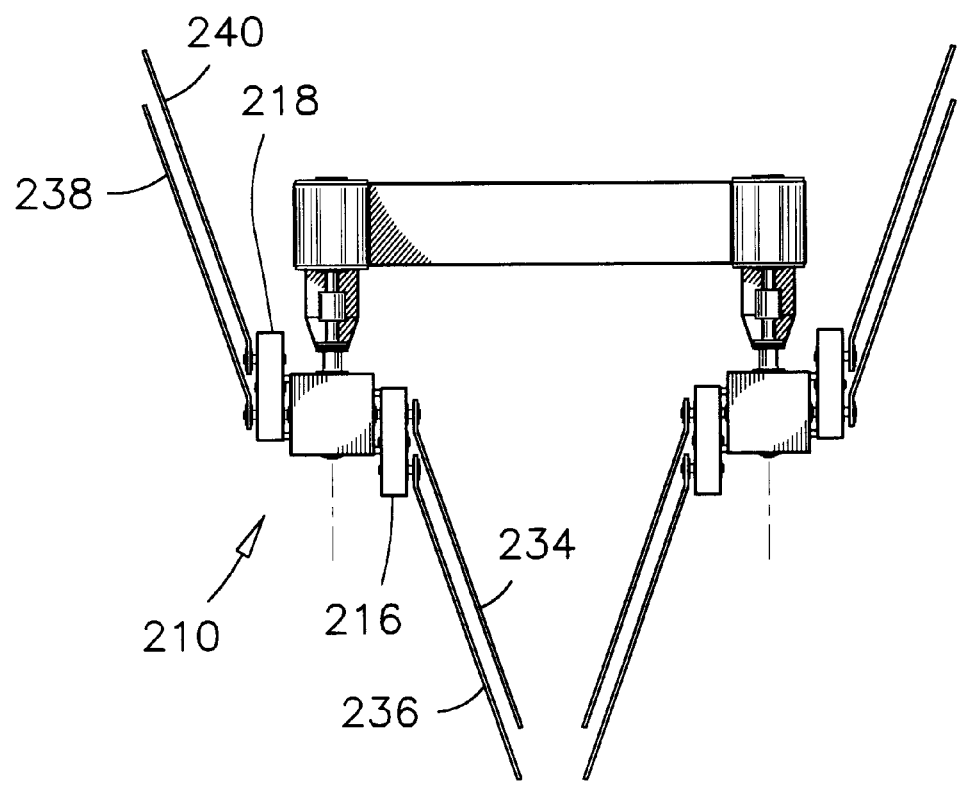
FIG. 15 is a second top view of the third ornithopter propelling arrangement wherein the wings are positioned along the return quadrants of the wing cycle.

In the illustrated example, the gear trains 216, 218 carry the pairs of wings 234, 236 and 238, 240 respectively. The wings in each pair work in unison with each other as illustrated in FIGS. 14 and 15. As can be appreciated, the wings deploy and flap down simultaneously as shown in FIG. 14 and stack up over one-another during the returning segments of the wing cycle for causing minimum air resistance during the returning segments as illustrated in FIG. 15.

Figure 12:
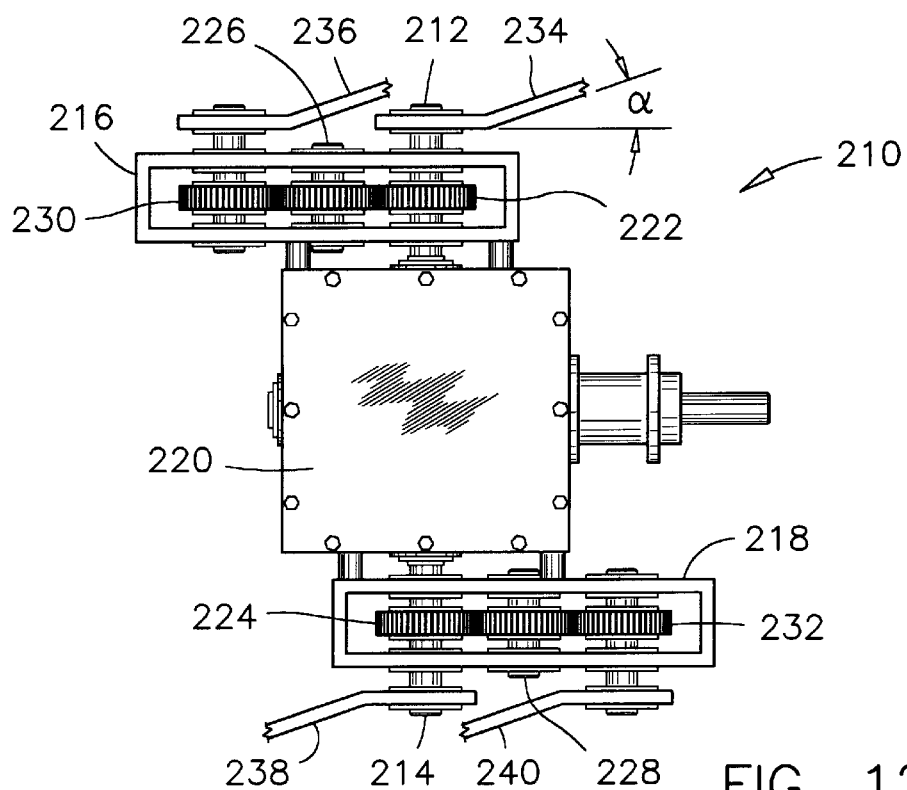
FIG. 12 is a plan view of a second adaptation of the wing movement of the preferred embodiment, wherein a pair of gear trains are mounted to the gearbox in a natural-like musical sign arrangement to drive two pairs of wings.

As may be seen in the illustrations, each wing is angled outwardly a nominal avoidance angle 'α' in FIG. 12 such that each wing can rotate over the output shaft of an adjacent wing.

Figure 13:
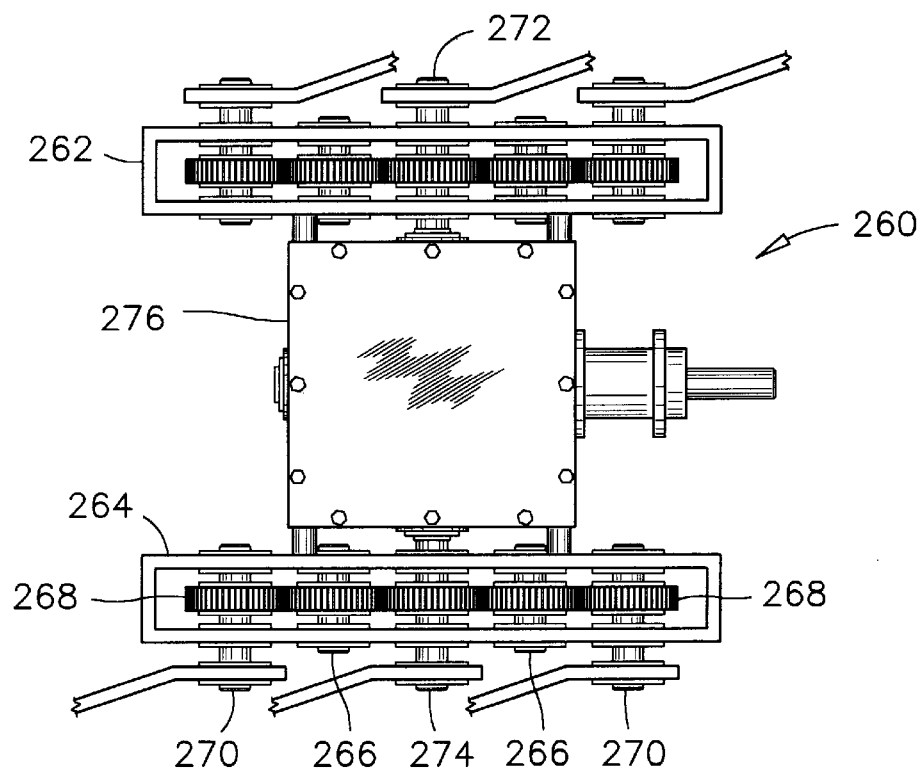
FIG. 13 is a plan view of a third adaptation of the wing movement of the preferred embodiment, wherein a pair of gear trains are mounted to the gearbox in a H-like arrangement to drive two sets of three wings.

In the third adaptation 260 as illustrated in FIG. 13, the gear trains 262 and 264 form an H-like configuration. Each gear train may contain a number of idler gears assembly 266 and a number of driven gears 268 driving a number of output shafts 270 and wings. As for the second adaptation, both gear trains 262 and 264 are driven by a pair of drive shafts 272, 274 extending from a gearbox 276 and having a gear mounted thereon as previously explained.

Figure 16:
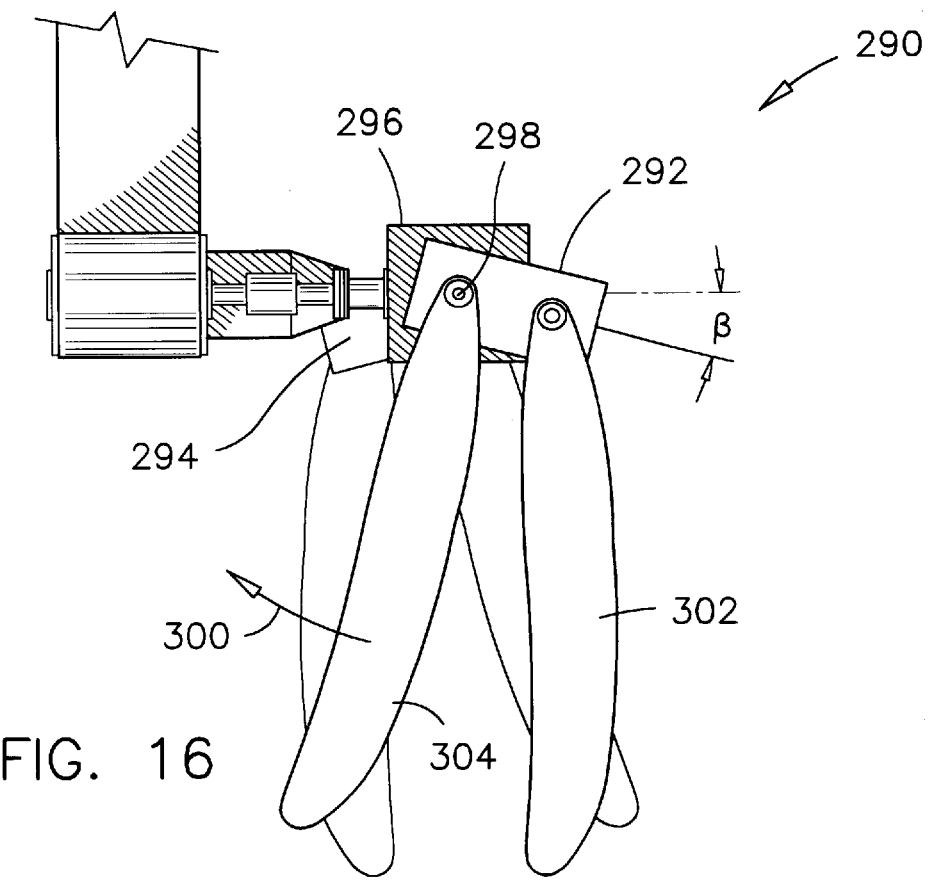
FIG. 16 illustrates a fourth adaptation of the wing movement according to the preferred embodiment, wherein the gear trains are shown in first rotated positions to maximize the effective portions of the wing cycle.
Figure 17:
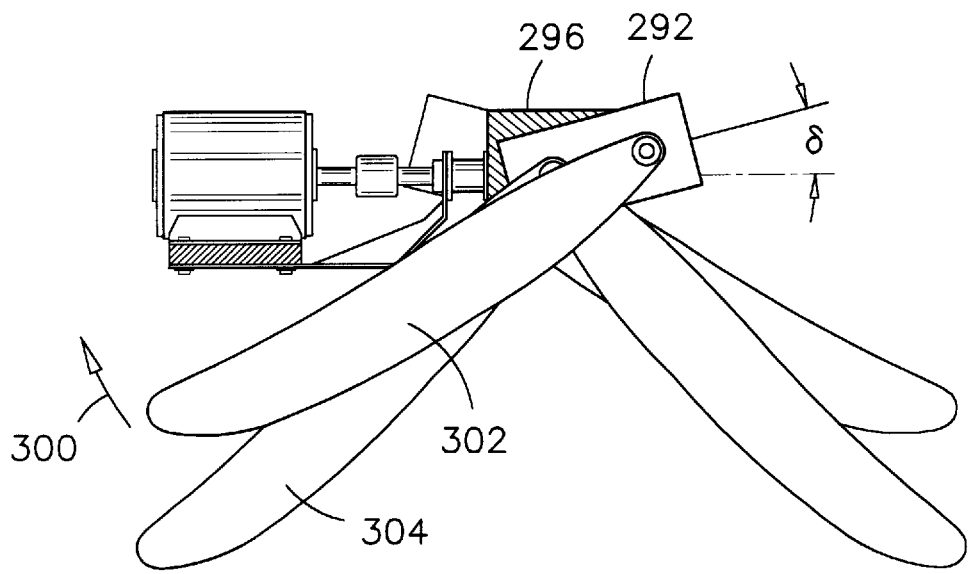
FIG. 17 shows the fourth adaptation of the preferred embodiment wherein the gear trains are shown in second rotated positions to minimize the air resistance on the wings during the return segments of the wing cycle.

Referring now to FIGS. 16 and 17, while looking at FIG. 12, the fourth adaptation 290 of the wing movement according to the preferred embodiment will be explained.

In this fourth adaptation 290, each gear train 292, 294 is movable relative to the gearbox 296, about a respective output shaft 298. A mechanism for moving each gear train about each output shaft is not illustrated herein for maintaining the clarity of the drawing. It is believed that a number of mechanisms to effect this movement is known to those knowledgeable in the field of Machine Design and can therefore be omitted from these illustrations.

In the illustration of FIG. 16 the wing movement is seen from above when the wings descend on their broad sides. During this portion of the cycle of the wing movement, the gear train 292 for example, is rotated in the direction 300 of the wing movement by a retard angle 'β' as shown in FIG. 16. The rotation of the gear train 292 by this retard angle causes the driven wing 302 for example to retard its movement relative to the drive wing 304 by the same angle. This causes the driven wing 302 to remain deployed over a longer period during the flap down quadrants of the wing cycle to maximize the lift force provided by this wing 302. It will be appreciated that when more than two wings are mounted on a longer gear train for example, each driven wing is retarded by the angle 'β' relative to the next one toward the drive wing 304.

During the raising of the wings on their edges, as illustrated in FIG. 17, the gear train 292 is rotated an advance angle 'δ' relative to the direction of rotation 300 of the wings, to cause the driven wing 302 and other driven wings (not shown) to advance relative to the drive wing 304. The advance angle causes the wings to stack up together faster than in the previous manner to minimize the air resistances on the wings during the returning quadrants of the wing cycle.

FIGS. 18–21 illustrates a fifth adaptation 310 of the wing movement according to the preferred embodiment. The purpose of this fifth adaptation 310 is similar to the one of the fourth adaptation 290, that is to maximize the surface of the wings during the down-stroke quadrants and minimize the air resistance on the wings during the up-stroke quadrants.

In the fifth adaptation each wing 312 is made of three blades 314, 316 and 318. The central blade 314 is rigidly connected to one of the output shaft 320 of the gearbox 322. The side blades 316 and 318 are pivotally connected to the central blade 314 by means of a pivot 324 extending through the three blades. The heels 326, 328 of the side blades 316, 318 are guided in a pair of grooves 330, 332 in a cam 334. The cam 334 is rigidly mounted to the gearbox 322 and encloses the base of the output shaft 320. Both heels 326, 328 are urged toward each other and against the cam 334 by a spring 338.

The cam 334 has a longer dimension along the drive axis 340 of the gearbox, whereby the side blades 316, 318 are caused to deploy during the down-stroke quadrants of the wing cycle and to collapse during the up-stroke quadrants as shown in FIGS. 19 and 20.

Figure 22:
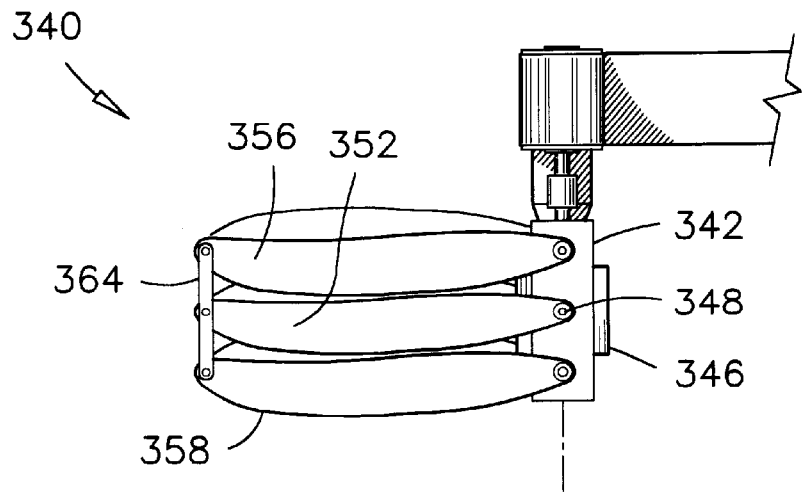
FIG. 22 illustrates a first top view of a sixth adaptation of the wing movement according to the preferred embodiment of the present invention, with the wings thereof positioned along the effective quadrants of the wing cycle, and wherein a drive wing entrains a pair of companion wings by means of a link member joining the tips of the wings.
Figure 23:
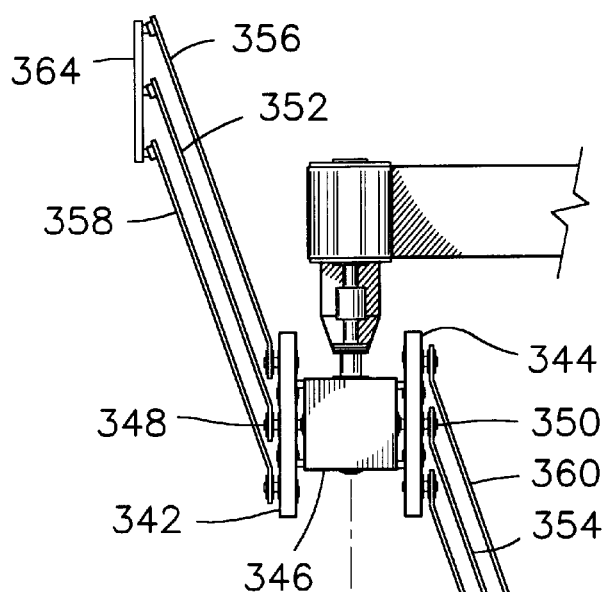
FIG. 23 is a second top view of the sixth adaptation of the wing movement according to the preferred embodiment of the present invention, showing the wings positioned along the return quadrants of the wing cycle.

In the sixth adaptation 340 of the wing movement according to the preferred embodiment, as illustrated in FIGS. 22 and 23, two sets of wings are supported on a pair bearing bars 342, 344 which are affixed to the gearbox 346. Two output shafts 348, 350 extend from the gearbox 346, through the bearing bars, to drive the central wings 352 and 354 respectively. Two pairs of companion wings 356, 358 and 360, 362 are movably mounted to the bearing bars 342, 344 and are actuated by a link member 364 or 366, connecting their tips to the tip of the central wing 352 or 354 respectively. The bearing bars 342, 344 carry bearings only to rotatively guide the inside ends of the wings. This arrangement is particularly advantageous for its light weight especially when several wings are articulated in groups.

Figure 24:
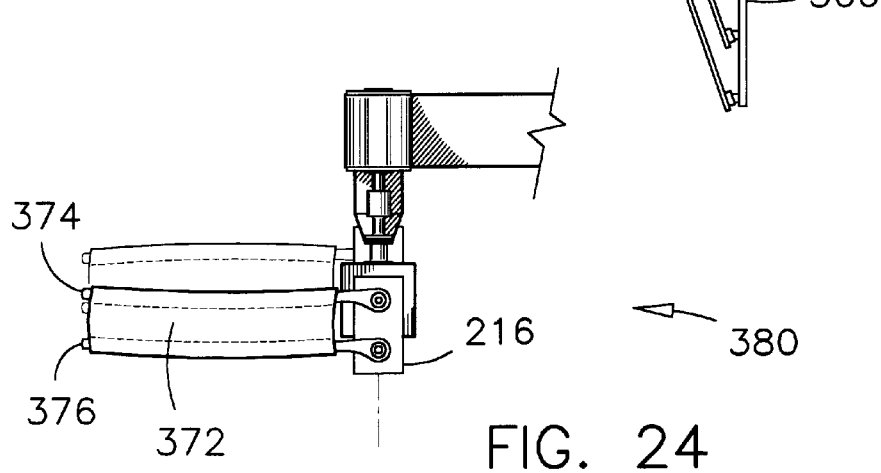
FIG. 24 is a top view of the seventh adaptation of the wing movement according to the preferred embodiment wherein each wing consist of a piece of fabric stretched across two parallel movable props.

Referring now to FIG. 24 it will be appreciated that when gear trains are used with the wing movements according to the second, third or fourth adaptation described above, the wings may be made of flexible fabric material 372 mounted between a pair of props 374, 376, to form a seventh adaptation 380 of the wing movement according to the preferred embodiment of the present invention. This particular arrangement is light in weight and may be preferred by some users to accommodate particular applications of the present invention.

Figure 25:
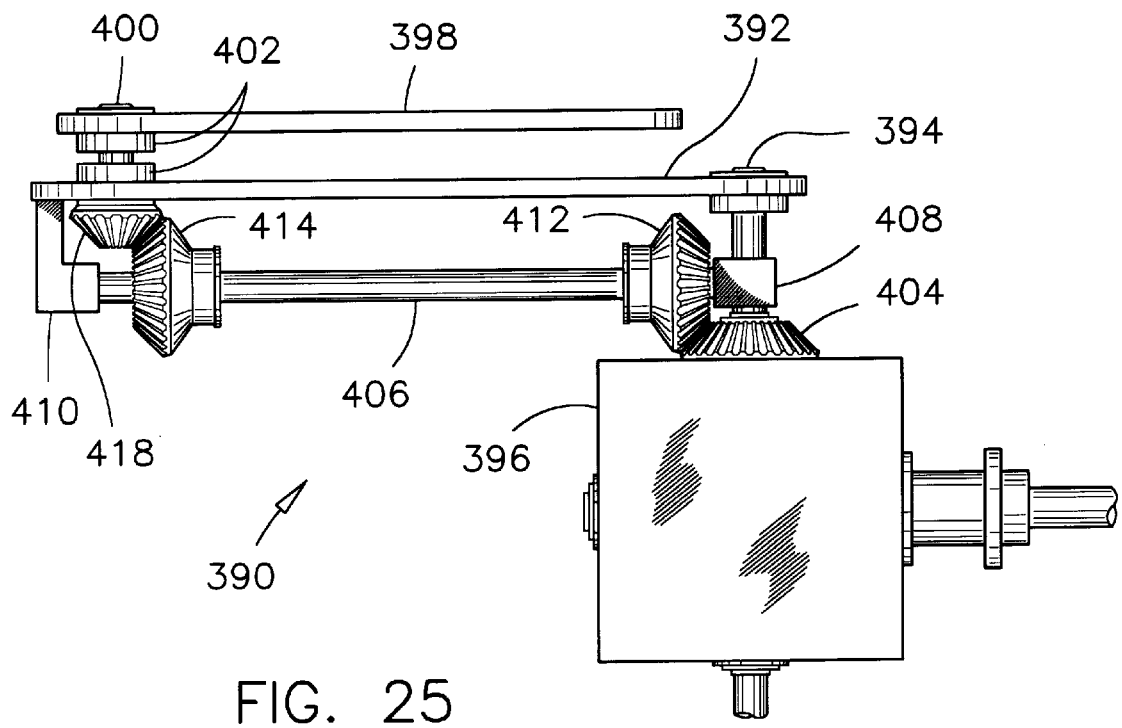
FIG. 25 is a plan view of the eighth adaptation of the wing movement according to the preferred embodiment wherein each wing is articulated at an intermediate region thereof.

FIG. 25 illustrates an eighth adaptation 390 of the wing movement according to the preferred embodiment of the present invention. In this adaptation each wing is made of two segments. The base segment 392 is mounted to the output shaft 394 of the gearbox 396, as explained before. The tip segment 398 of the wing is pivotally mounted to the base segment 392 on a stub shaft 400 and bearing assembly 402 affixed to the base segment 392. There is also provided, a second reference gear 404 affixed to the gearbox 396 at the base of the output shaft 394. A drive shaft 406 extends along the base segment 392. The drive shaft 406 is pivotally mounted to a first bearing block 408 which is movably fitted to the output shaft 394, and in a second bearing block 410 affixed to the far end of the base segment 392 of the wing. Near end and far end gears 412, 414, having a same pitch diameter are mounted to the drive shaft 406. The near end gear 412 is engaged with the second reference gear 404 and therefore rotates with the output shaft 394 when the base segment 392 rotates. The near end gear 412 also has same pitch diameter as the second reference gear 404, such that one rotation of the output shaft 394, causes the drive shaft 406 to rotate one turn.

There is also provided a pinion gear 418 mounted on the stub shaft 400 and engaged into the far end gear 414. The far end gear 414 and the pinion gear 418 have a gear ratio of 2/1 such that one rotation of the base segment 392 causes the tip segment 398 to rotate two full turns. This adaptation is particularly advantageous for deploying the tip segment of the wing during both down-stroke quadrants of the wing cycle, for increasing the effective surface of the wing, and for withdrawing the tip segment 398 as illustrated, during both up-stroke quadrants of the wing cycle, for reducing air resistance on the wing.

As it was mentioned herein before, it is possible to adjust the angular position of the reference bevel gear 114 in the wing movement according to the preferred embodiment, relative to the bracket 118, to simultaneously adjust the position of the effective segments of the wings relative to an horizontal plane, to control the lift on one or both wing movements 72, 74 as illustrated in FIGS. 3 and 4 for example, for manoeuvring a flying apparatus. Many mechanisms are available for adjusting the position of the reference bevel gear and are known to those skilled in the art of Machine Design. A suggested mechanism to obtain a manoeuvrability of an ornithopter having the wing movement according to the preferred embodiment is illustrated in FIG. 26 as one example only to demonstrate the possibilities and the various practical applications of the present invention.

Figure 26:
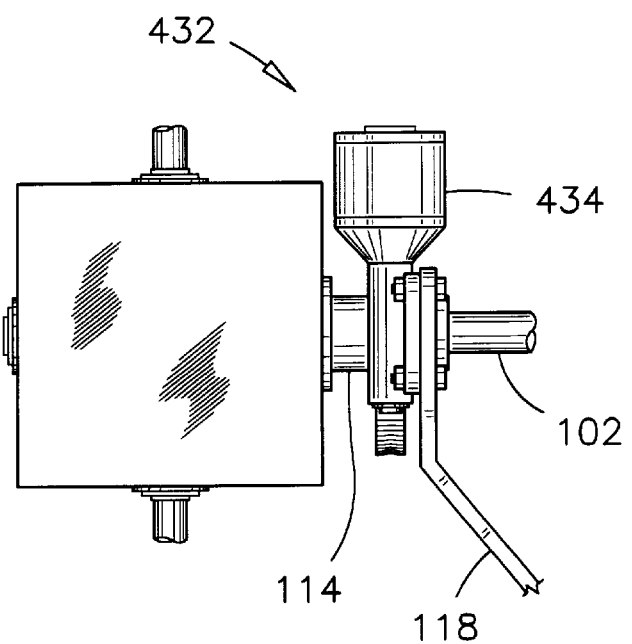
FIG. 26 is a plan view of the wing movement according to the preferred embodiment having a worm gear drive mounted thereon for adjusting the effective quadrants of the wing cycle relative to a plane of mounting of the drive motor of the wing movement.

In the illustration of FIG. 26 a conventional worm gear drive 432 is mounted to both the reference bevel gear 114 and the fixed bracket 118, to control a relative angular displacement between the reference bevel gear 114 and the support bracket 118. The preferred worm gear drive 432 has a servo or stepper motor 434 such that the relative position of the reference bevel gear 114 and of the support bracket 118 can be adjusted precisely.

While eight (8) adaptations of the preferred embodiment have been illustrated and described herein, it will be appreciated that some of the described adaptations can be combined to one or more of the other adaptations to further improve on the operation of the wing movement. Similarly, it is believed that other arrangements may be developed to take advantage of the wing movement of the present invention in other embodiments not illustrated herein. For example, while the present invention has been described as a wing movement where the wings move full cycles, it is believed that a similar movement using only a quarter of a cycle may be found to be advantageous for alternately deploying and retracting ailerons on a flying machine. It is also believed that other applications can be developed for use of the invention under water for example, without overly modifying the wing movement according to the preferred embodiment or any of the disclosed adaptations thereof.

In view of the above, it will be appreciated by those skilled in the art that various modifications, alternate constructions and equivalents may be employed without departing from the true spirit and scope of the invention. Therefore the above description and the illustrations should not be construed as limiting the scope of the invention which is defined by the appended claims.

We claim:

1. A wing movement for use in propelling ornithopters and apparatus of the like, comprising:

a base;

first and second perpendicular axes, said second axis intersecting said first axis at a mid point of said first axis;

means for retaining said second axis to said base;

a pair of first wings mounted on said first axis, one of said first wings being on each side of said second axis;

means for rotating said first wings in opposite directions relative to each other about said first axis;

means for rotating said first axis and said first wings about said second axis; and means for synchronising a rotation of said first wings about said first axis, with a rotation of said first axis and said first wings about said second axis;

such that said first wings are movable to define a curved infinity-symbol-like pattern projecting substantially along one side of said second axis.

2. The wing movement as claimed in claim 1, further comprising:

a third axis extending at right angle with said first and second axes and having a central region coincident with said mid point of said first axis;

a pair of second wings mounted on said third axis, one of said second wings being on each side of said first and said second axes;

means for rotating said second wings in opposite directions relative to each other about said third axis;

means for rotating said third axis and said second wings about said second axis;

means for synchronising a rotation of said second wings with a rotation of said first wings; and means for synchronising, a rotation of said third axis and said second wings about said second axis with a rotation of said first axis and said first wings about said second axis.

3. The wing movement as claimed in claim 1, wherein said means for synchronising a rotation of said first wings about said first axis with a rotation of said first axis and said first wings about said second axis comprises a gearbox enclosing four bevel gears mounted in a rectangular arrangement.

4. The wing movement as claimed in claim 1, wherein said means for rotating said first axis about said second axis comprises a reference gear affixed to said base, and said means for retaining said second axis to said base comprises adjustment means for angularly adjusting said reference gear about said second axis relative to said base.

5. An ornithopter propelling arrangement comprising a first and second wing movements and a frame extending between said first and second wing movements and holding said first and second wing movements in a spaced-apart relationship; said first wing movement comprising:

first and second perpendicular axes, said second axis intersecting said first axis at a mid point of said first axis;

means for retaining said second axis to said frame;

a pair of first wings mounted on said first axis, one of said first wings being on each side of said second axis;

means for rotating said first wings in opposite directions relative to each other about said first axis;

means for rotating said first axis and said first wings about said second axis in a first rotational mode; and means for synchronising a rotation of said first wings about said first axis, with a rotation of said first axis and said first wings about said second axis;

said second wing movement comprising:

third and fourth perpendicular axes, said fourth axis intersecting said third axis at a mid point of said third axis;

means for retaining said fourth axis to said frame;

a pair of spaced apart second wings mounted on said third axis, one of said second wings being on each side of said fourth axis;

means for rotating said second wings in opposite directions relative to each other about said third axis;

means for rotating said third axis and said second wings about said fourth axis in a second rotational mode, opposite said first rotational mode; and means for synchronising a rotation of said second wings about said third axis, with a rotation of said third axis and said second wings about said fourth axis;

such that said first wings are movable to define a first curved infinity-symbol-like pattern projecting substantially along one side of said frame, and said second wings are movable to define a second infinity-symbol-like pattern projecting along a second side of said frame.

6. The ornithopter propelling arrangement as claimed in claim 5, wherein said first and second wing movements and said frame define an unobstructed space there-between.

7. A wing movement for propelling ornithopters and apparatus of the like, comprising:

a gearbox having a housing, a reference gear extending through said housing and being movably mounted to said housing, an input shaft extending through said reference gear and into said housing, and a first output shaft movably extending from said housing at right angle relative to said input shaft;

a motor having a motor base and a drive shaft connected to said input shaft of said gearbox for rotation of said input shaft;

a bracket connected to said motor base and to said reference gear for retaining said reference gear to said motor base, with an axis of said reference gear in alignment with said drive shaft;

a gearing system mounted inside said housing for rotating said first output shaft one full turn upon a rotation of said input shaft one full turn, and for rotating said gearbox one full turn about said reference gear upon a rotation of said first output shaft one full turn, and a first wing mounted to said first output shaft outside said gearbox for rotation by said first output shaft;

such that when said motor base is adapted to be held fixed and said motor is adapted to be operated, said wing is movable to define a curved infinity-symbol-like pattern projecting substantially along one side of said motor.

8. The wing movement as claimed in claim 7 further comprising a second output shaft movably extending from said housing in opposite direction and from an opposite side of said gearbox relative to said first output shaft;

said second output shaft being connected to said gearing system and said gearing system having means for rotating said second output shaft one full turn upon a rotation of said input shaft one full turn, and means for rotating said second output shaft in opposite direction relative to said first output shaft, and a second wing mounted to said second output shaft outside said gearbox for rotation with said second output shaft in opposite direction relative to said first wing.

9. The wing movement as claimed in claim 8, further comprising a third and fourth output shafts movably extending from said housing in opposite directions from each other and at right angles with said first and second output shafts, from adjacent sides of said gearbox relative to said first and second output shafts;

said third and fourth output shafts being connected to said gearing system, and said gearing system having means for rotating each of said third and fourth output shafts one full turn upon a rotation of said input shaft one full turn, and means for rotating said third and fourth output shafts in opposite directions relative to each other and to said first and second output shafts, and third and fourth wings mounted to said third and fourth output shafts respectively outside said gearbox for rotation by said third and fourth output shafts in opposite directions relative to each other and to said first and second wings.

10. The wing movement as claimed in claim 8, wherein said gearing system comprises a drive pinion mounted on said drive shaft and a first and second driven gears engaged with said drive pinion and said fixed reference gear, said first and second driven gears being affixed to said first and second output shafts respectively for rotating said first and second output shafts.

11. The wing movement as claimed in claim 10, wherein said fixed reference gear, said drive pinion and said first and second driven gears are bevel gears having a common pitch diameter.

12. The wing movement as claimed in claim 9, wherein said gearing system comprises:

a drive pinion mounted on said input shaft;

first and second driven gears engaged with said drive pinion and said fixed reference gear, said first and second driven gears being affixed to said first and second output shafts respectively for rotating said first and second output shafts;

first and second gear plates mounted to said first and second output shafts respectively outside said first and second driven gears relative to said input shaft, for rotation with said first and second driven gears, first and second crown gears mounted to said third and fourth output shafts respectively and being simultaneously engaged with said first and second gear plates for rotation with said first and second gear plates and said first and second driven gears while being at a distance from said drive pinion and said fixed reference gear.

13. The wing movement as claimed in claim 8, further comprising first and second gear trains mounted to said first and second output shafts respectively, and said first and second gear trains having means for rotating a plurality of wings in unison.

14. The wing movement as claimed in claim 13, wherein said first and second gear trains are mounted to said gearbox in a natural-like musical sign arrangement relative to said first and second output shafts.

15. The wing movement as claimed in claim 13, wherein said first and second gear trains are mounted to said gearbox in a H-like arrangement relative to said first and second output shafts.

16. The wing movement as claimed in claim 14, further comprising means for angularly moving said first and second gear trains about said first and second output shafts respectively.

17. The wing movement as claimed in claim 7, further comprising a cam mounted to said gearbox about said output shaft, a plurality of blades movably affixed to said first wing and to said cam, and means for alternatively actuating said blades from a stacked position to a deployed position relative to said first wing, upon a rotation of said first wing.

18. The wing movement as claimed in claim 8, further comprising a first and second bearing bars mounted to said gearbox about said first and second output shafts respectively and a first and second pluralities of wings mounted to said first and second bearing bars respectively; and still further comprising a first and second link members respectively joining said first and second wings to said first and second pluralities of wings for moving said first and second pluralities of wings in unison with said first and second wings.

19. The wing movement as claimed in claim 8, further comprising a first and second gear trains mounted to said first and second output shafts respectively, and each of said first and second wings comprising a pair of prop members mounted to one of said gear trains, and a piece of flexible fabric material joining said prop members.

20. The wing movement as claimed in claim 7, wherein said first wing comprises:
- a base segment mounted to said first output shaft for rotation with said first output shaft;
- a tip segment movably mounted to said base segment for rotation relative to said base segment; and
- means for rotating said tip segment two full turns upon each rotation of said base segment.

* * * * *

UNITED STATES PATENT AND TRADEMARK OFFICE
CERTIFICATE OF CORRECTION

PATENT NO.     : 6,227,483 B1
DATED          : May 8, 2001
INVENTOR(S)    : Clément Therriault (deceased) and Michel Therriault It is certified that error appears in the above-identified patent and that said Letters Patent is hereby corrected as shown below:

<u>Title page,</u>
The names of the inventors should read as follows:
Inventors: Clément Therriault, deceased, late of
Edmundston, New Brunswick, Canada and
Michel Therriault
262 Chemin Desherbiers
St-Louis-de-Kent, New Brunswick
Canada E4X 1S8

Signed and Sealed this

Twenty-ninth Day of January, 2002

*Attest:*

*Attesting Officer*

JAMES E. ROGAN
*Director of the United States Patent and Trademark Office*